(12) United States Patent
Heller (10) Patent No.: US 7,731,260 B2
(45) Date of Patent: Jun. 8, 2010

(54) VEHICLE LOAD-CARRYING BED SYSTEM HAVING BED DIVIDER

(75) Inventor: Aaron L. Heller, Lewis Center, OH (US)

(73) Assignee: Honda Motor Co., Ltd., Tokyo (JP)

( * ) Notice: Subject to any disclaimer, the term of this patent is extended or adjusted under 35 U.S.C. 154(b) by 31 days.

(21) Appl. No.: 11/767,093

(22) Filed: Jun. 22, 2007

(65) Prior Publication Data

US 2008/0315608 A1    Dec. 25, 2008

(51) Int. Cl.
*B62D 33/023*    (2006.01)
(52) U.S. Cl. .................... 296/50; 296/24.4; 296/37.6
(58) Field of Classification Search ............. 296/183.1, 296/182.1, 37.6, 50, 57.1, 62, 61, 37.1, 26.11, 296/26.08, 24.4; 410/118, 129
See application file for complete search history.

(56) References Cited

U.S. PATENT DOCUMENTS

| | | | |
|---|---|---|---|
| 2,823,068 A * | 2/1958 | Walker | 296/37.2 |
| RE33,200 E * | 4/1990 | Reynolds et al. | 296/39.1 |
| 5,083,829 A | 1/1992 | Fonseca | |
| 5,271,656 A | 12/1993 | Hull et al. | |
| 5,427,486 A | 6/1995 | Green | |
| 5,518,158 A | 5/1996 | Matlack | |
| 5,702,144 A | 12/1997 | Matsuura et al. | |
| 5,720,507 A * | 2/1998 | Emery | 296/39.2 |
| 6,033,003 A * | 3/2000 | Bell et al. | 296/37.3 |
| 6,155,625 A * | 12/2000 | Felix | 296/37.14 |
| 6,390,527 B1 | 5/2002 | Leftridge | |
| 6,478,356 B1 | 11/2002 | Wayne | |
| 6,550,836 B2 | 4/2003 | Rigau | |
| 6,811,067 B2 | 11/2004 | Muizelaar et al. | |
| 6,843,519 B2 | 1/2005 | Ojanen | |
| 7,175,218 B1 * | 2/2007 | Keene | 296/26.08 |
| 2005/0036849 A1 | 2/2005 | Kiester et al. | |
| 2006/0222471 A1 | 10/2006 | Lussier | |
| 2007/0090662 A1 | 4/2007 | Katterloher et al. | |

\* cited by examiner

*Primary Examiner*—Glenn Dayoan
*Assistant Examiner*—Melissa A Black
(74) *Attorney, Agent, or Firm*—Mark E. Duell; Rankin Hill & Clark LLP (57) ABSTRACT

A load-carrying bed system for a vehicle having a cargo bed includes a bed floor defining a cargo receiving area and first and second sidewalls disposed along lateral sides of the bed floor. A forward wall is disposed along a forward side of the bed floor and laterally between the first and second sidewall. A tailgate is disposed along the rearward side of the bed floor and laterally between the first and second sidewalls. A cargo bed divider is movable between a stowed state wherein the cargo bed divider is stowed in a cargo bed divider cavity defined in the tailgate and a dividing state wherein the cargo bed divider has a first end removably secured to the first sidewall and a second end removably secured to second sidewall to divide the bed floor into distinct storage areas.

18 Claims, 9 Drawing Sheets

VEHICLE LOAD-CARRYING BED SYSTEM HAVING BED DIVIDER

BACKGROUND

The present disclosure generally relates to load-carrying beds for vehicles, and more particularly to a load-carrying bed system for a vehicle having a cargo bed including a stowable cargo bed divider.

There are several known dividers for vehicle cargo beds. However, usually these dividers are after-market parts and/or are not well integrated into the design of the vehicle bed. For example, while some beds include structure for particularly positioning the divider in a desired location or locations in the vehicle bed, there is often not an easy and aesthetically pleasing place in which to stow the divider when not in use.

Accordingly, there is a need for a bed divider that is integrated into the base vehicle design and a further need for a bed divider that is easily stowed when not in use in a functional and aesthetically pleasing way.

BRIEF DESCRIPTION

According to one aspect, a load-carrying bed system for a vehicle having a cargo bed is provided. More particularly, in accordance with this aspect, the bed system includes a bed floor including a cargo receiving area and first and second sidewalls disposed along lateral sides of the bed floor. A forward wall is disposed along a forward side of the bed floor and laterally between the first and second sidewalls. A tailgate is disposed along a rearward side of the bed floor and laterally between the first and second sidewalls. A cargo bed divider is movable between a stowed state wherein a cargo bed divider is stowed in a cargo bed divider cavity defined in the tailgate and a dividing state wherein the cargo bed divider has a first end removably secured to the first sidewall and a second end removably secured to the second sidewall to divide the bed floor into distinct storage areas.

According to another aspect, the tailgate assembly for a vehicles load-carrying bed is provided. More particularly, in accordance with this aspect, the tailgate assembly includes a tailgate for selectively closing one end of the load-carrying bed. The cargo bed divider cavity is defined in the tailgate. A generally rigid divider is nestably received in the cavity. The divider is removable from the cavity and positionable within the load-carrying bed for dividing the bed into sections.

According to still another aspect, a combination load-carrying bed system and tailgate assembly is provided. More particularly, in accordance with this aspect, the combination load-carrying bed system and tailgate assembly includes a load-carrying bed having a bed floor, first and second sidewalls disposed along sides of the bed floor, and a forward wall disposed along a forward side of the bed floor. A tailgate is disposed along a rearward side of the bed floor for selectively closing one end of the load-carrying bed. A bed divider is provided for selectively dividing the bed into sections. A cavity is defined in the tailgate and configured to nestably receive the bed divider therein for storing and hiding the divider when not in-use dividing the bed into sections.

DETAILED DESCRIPTION

Figure 1:
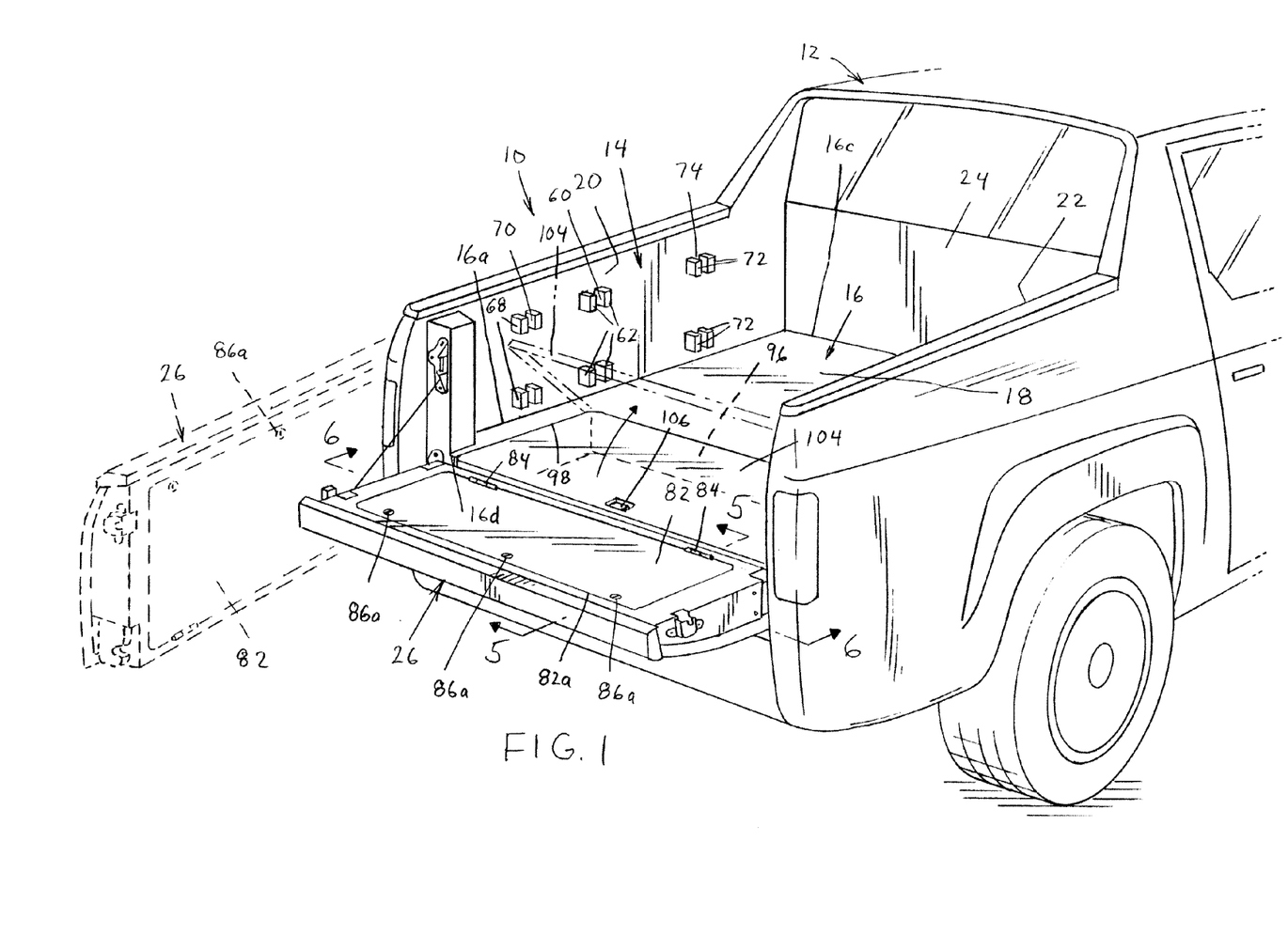
FIG. 1 is a partial perspective view of a vehicle having a load-carrying bed system having a divider stowed within a divider cavity defined in the tailgate.

Referring now to the drawings, wherein the showings are for purposes of illustrating one or more exemplary embodiments, FIG. 1 shows a load-carrying bed system 10 for a vehicle 12 having a cargo bed 14. The cargo bed 14 has a bed floor 16 defining a cargo receiving area 18. First and second sidewalls 20, 22 are disposed along lateral sides 16a, 16b of the bed floor 16. More particularly, the first lateral sidewall 20 (the left side wall in FIG. 1) is disposed along the first lateral side 16a of the bed floor 16. The second lateral sidewall (the right sidewall in FIG. 1) is disposed along the second lateral side 16b (FIG. 4) of the bed floor 16. A forward wall 24 is disposed along a forward side 16c of the bed floor 16 and laterally positioned between the first and second sidewalls 20, 22. A tailgate 26 is disposed along a rearward side 16d of the bed floor 16 and is positioned laterally between the first and second sidewalls 20, 22. In the illustrated embodiment, the tailgate 26 is shown as a dual-mode tailgate capable of folding open as shown or swinging open as shown in phantom. Of course, the tailgate 26 could be any other type of tailgate, including one that simply folds open about a single axis.

Figure 2:
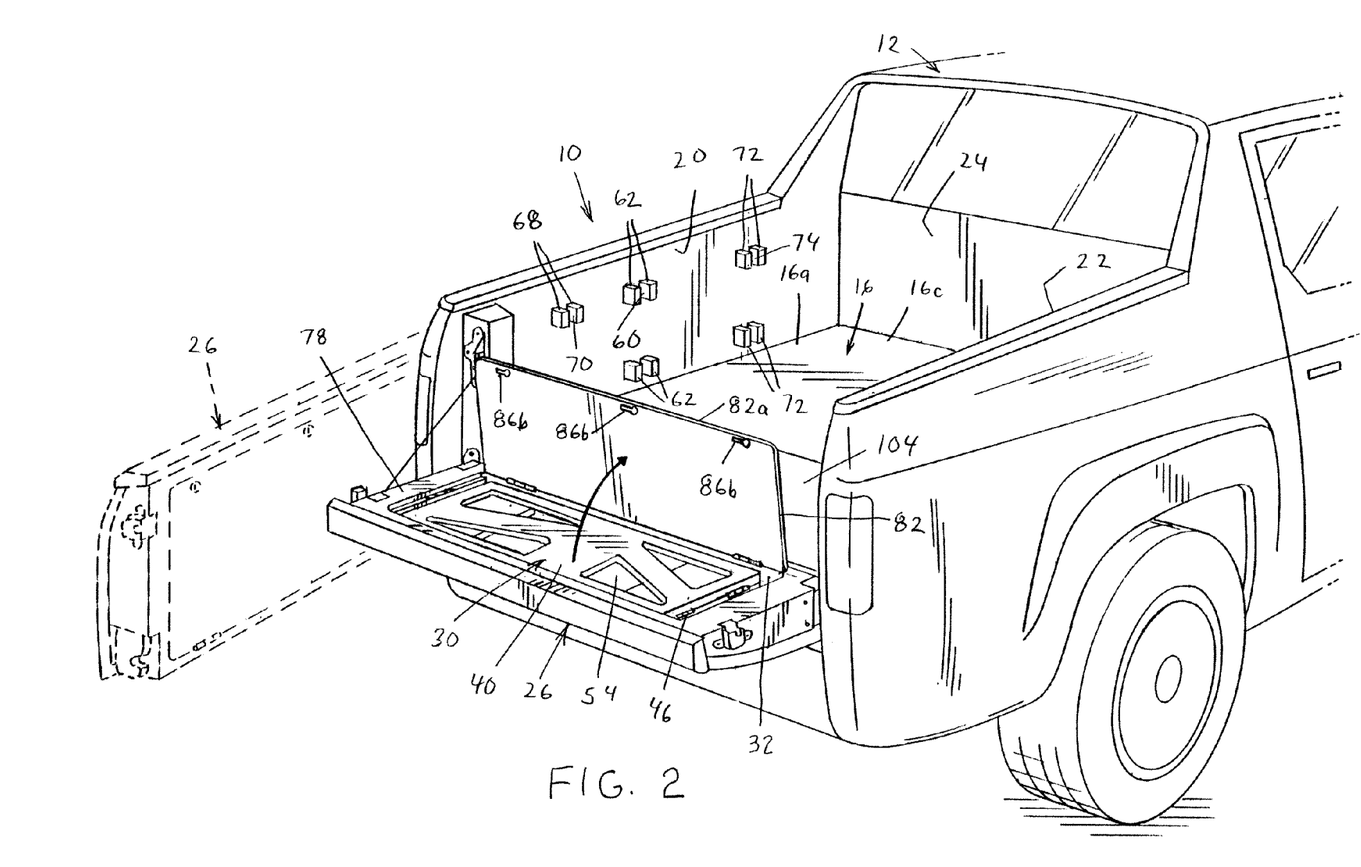
FIG. 2 is a perspective view of the load-carrying bed system showing a lid of the tailgate pivoted to an open position to provide access to the divider in the divider cavity.
Figure 3:
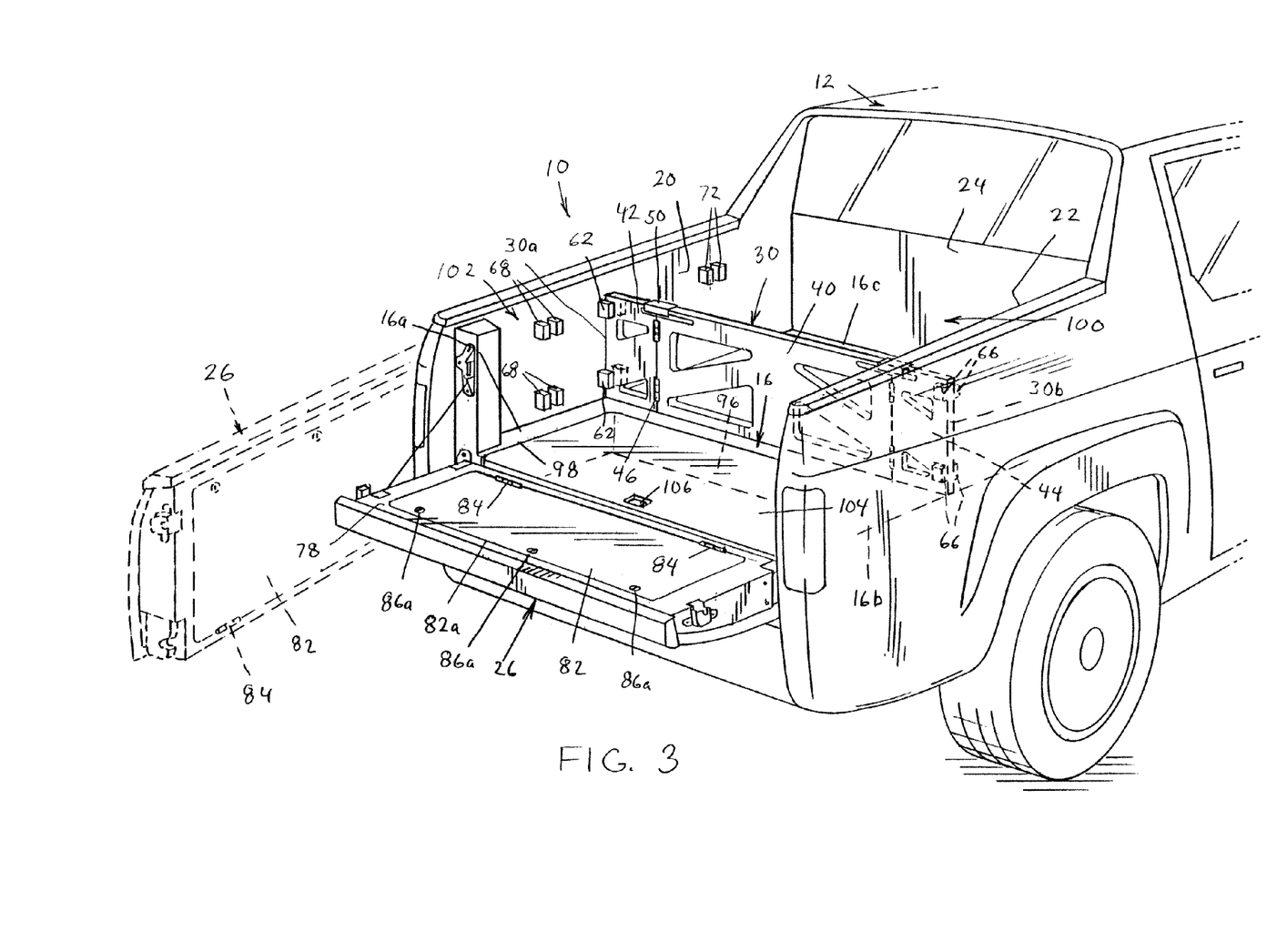
FIG. 3 is perspective view of the load-carrying bed system showing the divider removed from the tailgate cavity and positioned between sidewalls of the cargo bed.

With additional reference to FIGS. 2 and 3, the load-carrying bed system 10 further includes a cargo bed divider 30 that is movable between a stowed state (FIGS. 1 and 2) and a dividing state (FIG. 3). In the stowed state, the divider 30 is stowed in a cargo bed divider cavity 32, also referred herein as a tailgate cavity, defined in the tailgate 26. In the dividing state, the divider 30 has a first end 30a removably secured to the first sidewall 20 and a second end 30b removably secured to the second sidewall 22 to divide the bed floor 16 into distinct storage areas. The cargo bed divider 30 can be generally rigid or can be formed of generally rigid sections.

Figure 7:
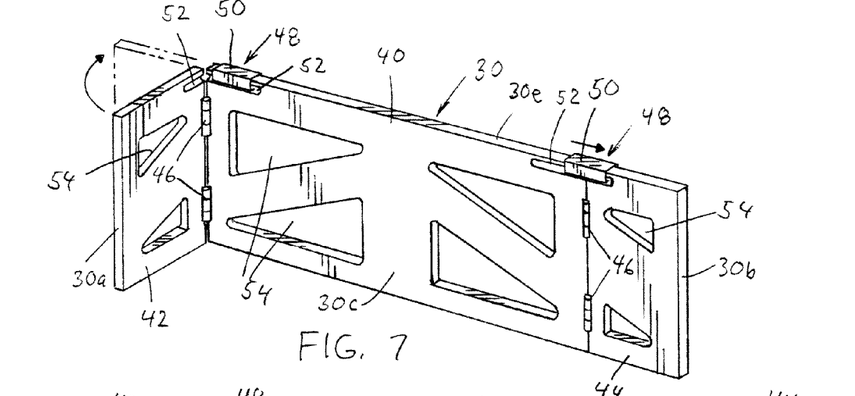
FIG. 7 is a perspective view of the divider showing that extension sections of the divider are pivotably movable relative to a main section.
Figure 8:
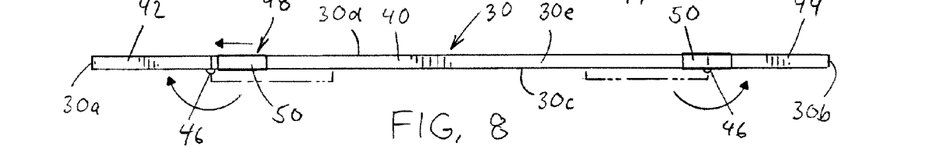
FIG. 8 is a plan view of the divider of FIG. 7 shown with both extension sections in their respective expanded positions.
Figures 9, 10:
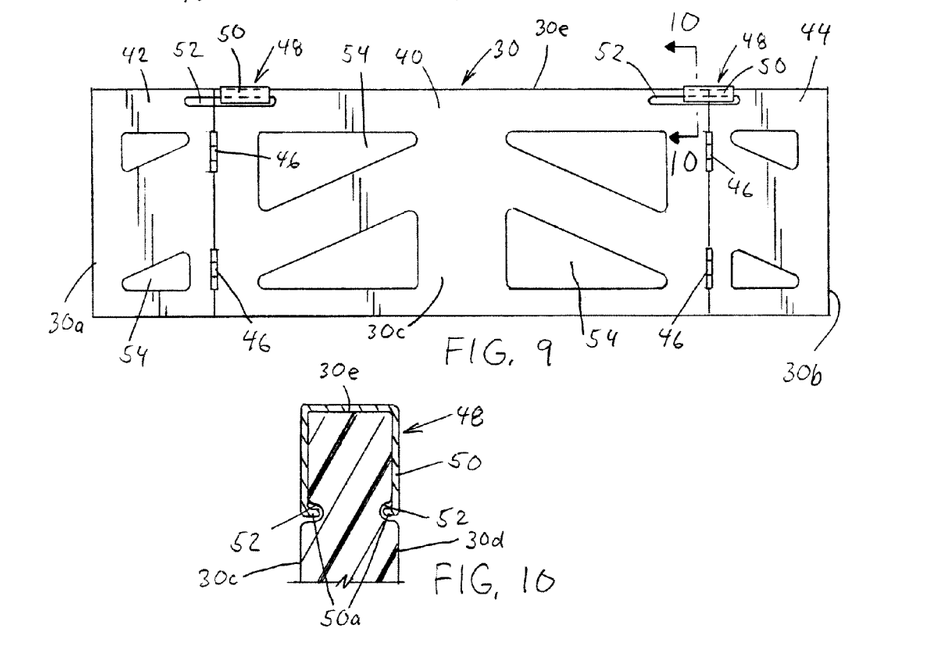
FIG. 9 is an elevational view of the divider of FIG. 7 showing the extension sections in their respective expanded positions.
FIG. 10 is a partial cross-sectional view of the divider taken along the line 10-10 of FIG. 9.
Figure 11:
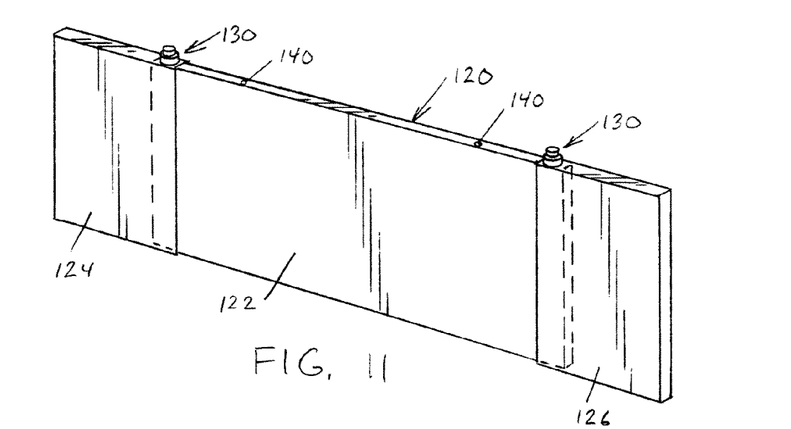
FIG. 11 is a perspective view of a divider according to an alternate embodiment.

With reference to FIGS. 7-9, the cargo bed divider 30 includes a main divider section 40 and a pair of extension divider sections 42, 44 flanking the main divider section 40. In particular, the first extension divider section 42 can include the divider first end 30a and a second extension divider section 44 can include the divider second end 30b. As shown, each of the extension divider sections 42, 44 is movable between an expanded position and a compact position. In FIGS. 8 and 9, both sections 42, 44 are shown in their respective expanded positions. In FIG. 7, the section 44 is shown in its expanded position and the section 42 is shown moving from its compact position toward its expanded position. As will be discussed in more detail below, the divider sections 40, 42 are each in their respective expanded positions when the cargo bed divider 30 is in its dividing state (shown in FIG. 3) and each of the divider sections 40, 42 is in its compact position when the cargo bed divider 30 is in its stowed state (best shown in FIG. 2).

More particularly, each of the divider sections 42, 44 is pivotally attached to the main divider section 40 for movement between respective expanded positions and respective compact positions. Thus, each of the divider sections 42, 44 is foldable onto the main section 40 when moved from the expanded position to the compact position for compacting the divider 30 for stowage (i.e., the stowed state) in the cavity 32 defined in the tailgate 26. Conversely, each of the divider sections 42, 44 is unfoldable from the main section 40 when moved from the compact position to the expanded position for expanding the cargo bed divider 30 (i.e., the divider or in-use state) for use in separating the bed floor 16 into distinct storage areas.

As shown, the pivotal attachment between the divider sections 42, 44 and the main section 40 can be provided by hinges 46 disposed between each of the divider sections 42, 44 and the main section 40. The hinges 46 can be positioned along a rearward side 30c of the divider to permit pivotal movement only between the compact position and the expanded position (i.e., the sections 42, 44 are not able to pivot beyond their respective expanded positions relative to the main section 40). Optionally, with additional reference to FIG. 10, a locking mechanism 48 can be provided between each divider section 42, 44 and the main section 40. In the illustrated embodiment, the locking mechanism 48 includes a locking member 50 slidably disposed along grooves 52 defined collinearly along the main section 40 and the adjacent extension section 42, 44.

More particularly, the locking member 50, which is disposed along upper edge 30e of the divider 30, can include protruding or flange portions 50a that are received within the grooves 52 to secure the locking member 50 to the divider 30. Each set of grooves (a set can include a groove disposed on the rearward side 30c of the divider 30 and an aligned groove disposed on a forward side 30d of the divider 30) can extend along a portion of the main section 40 and onto an adjacent one of the extension sections 42 or 44. Each locking member 50 can then be slidably moved along its set of grooves 52 so as to be movable between an unlocked position and a locked position. With particular reference to FIG. 9, the locking member 50 provided or selectively locking the extension section 42 in its expanded position relative to the main section 40 is depicted in the unlocked position and the locking member 50 provided for selectively locking the extension section 44 relative to the main section 40 is shown in the locked position.

Additionally, the divider 30 can include apertures 54 provided therethrough for allowing air flow to pass thereby. In the illustrated embodiment, each of the sections 40, 42, 44 includes such apertures 54 but it is to be appreciated by those skilled in the art that any one of the sections can include or not include the apertures 54. Also, as will be understood and appreciated by those skilled in the art, the apertures 54 may vary in shape and may not be positioned and/or shaped in various configurations/arrangements other than as illustrated.

Figure 4:
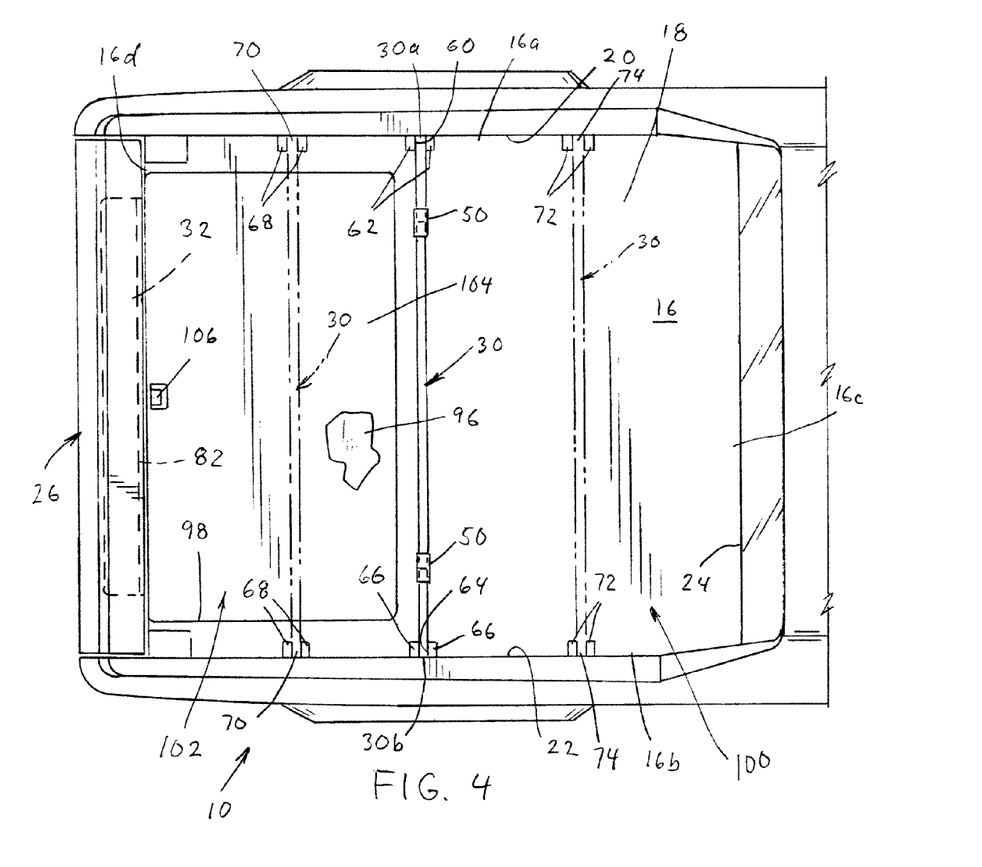
FIG. 4 is a partial plan view of the load-carrying bed system of FIG. 3.

Returning reference to FIGS. 1-4, the load-carrying bed system 10 can further include a plurality of bed divider locaters for locating the divider 30 in one or more predetermined positions within the cargo bed 14 and along the bed floor 16. With particular reference to FIG. 4, the divider 30 is shown in a dividing state wherein a first end 30a of the divider is received in a first channel 60 defined between first bed divider locaters 62 protruding into the cargo receiving area 18 from the first sidewall 20 and the second end 30b of the divider is received in a second channel 64 defined between second bed divider locaters 66 protruding into the cargo receiving area 18 from the second sidewall 22. As shown, the first channel 60 can be longitudinally aligned with the second channel 64 along the bed floor 16 to position the divider 30 laterally across the bed floor 16 in a first predetermined position (for example, the position shown in FIG. 4). The first bed divider locaters 62 and the second bed divider locaters 66 can be said to form a first set of bed divider locaters 62, 66 for locating the divider 30 in the first predetermined position.

The load-carrying bed system 10 can include one or more additional sets of bed dividers protruding into the cargo receiving area 18 from the sidewalls 20, 22 and each one or more additional sets could define longitudinally aligned channels on the first and second sidewalls 20, 22 to position the divider 30 laterally across the bed floor 16 in one or more additional predetermined positions. For example, as illustrated, a rearward or second set of dividers 68 could be disposed longitudinally behind and spaced apart from the dividers 62, 66 so as to define a second set of bed divider locators. The set of dividers 68 can protrude into the cargo receiving area 18 from the sidewalls 20, 22 and can define longitudinally aligned channels 70 on the first and second sidewalls 20, 22 to position the divider 30 laterally across the bed floor 16 in a second predetermined position.

Additionally, for example, a forward or third set of dividers 72 could be disposed longitudinally forward and spaced apart from the first predetermined position along the bed 16. The third set of dividers 72 can protrude into the cargo receiving area 18 from the sidewalls 20, 22 and can define longitudinally aligned channels 74 on the first and second sidewalls 20, 22 to position the divider 30 laterally across the bed floor 16 in a third predetermined position. Those skilled in the art will understand and appreciate that any number of sets of dividers can be provided in association with the load-carrying bed system for providing any number of predetermined positions along the bed floor 16. Additionally, it is contemplated that divider sets could protrude from the forward wall 24 and the tailgate 26 so as to define predetermined positions extending longitudinally between the forward wall 24 and the tailgate 26.

In the illustrated embodiment, the dividers are grouped such that a set of dividers defining a predetermined position include a set of four dividers, two upper spaced apart dividers and two lower spaced apart dividers, disposed along each sidewall 20, 22. However, it is to be appreciated and understood by those skilled in the art that other types and numbers of divider locaters could be provided for use with the divider 30. For example, a set of dividers may only include two spaced apart locaters on each sidewall 20, 22 for each predetermined position.

Figure 5:
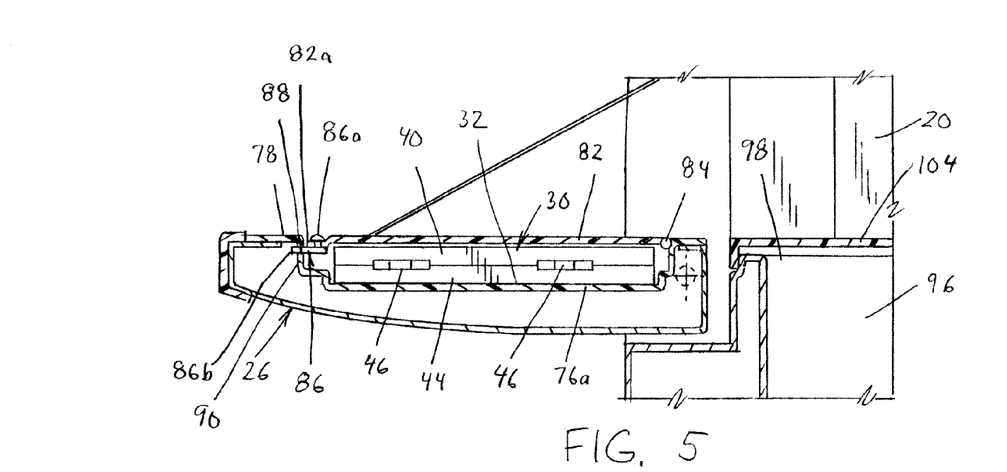
FIG. 5 is a partial cross-sectional view of the load-carrying bed system taken along the line 5-5 of FIG. 1 showing the divider resting nestably within the tailgate cavity.
Figure 6:
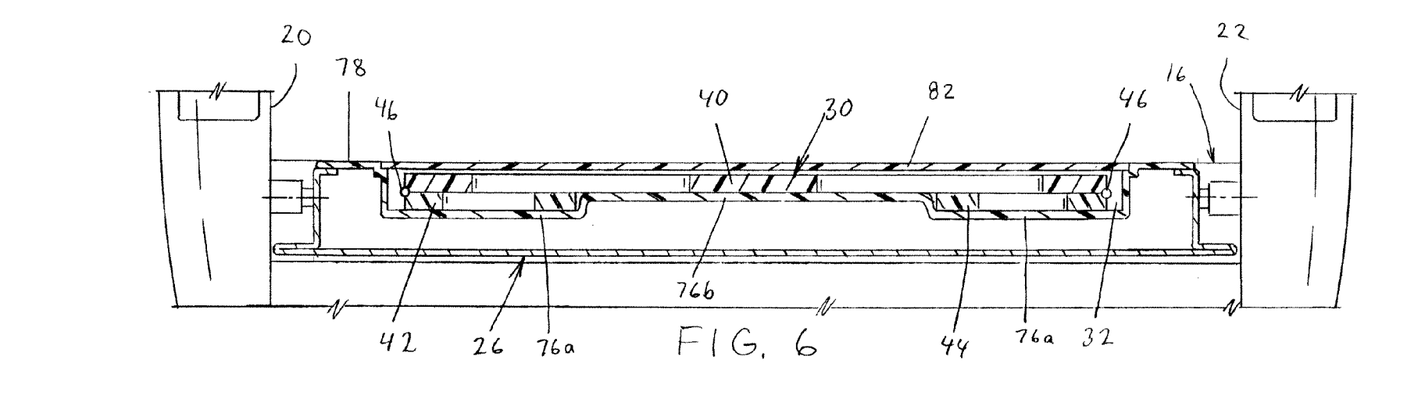
FIG. 6 is a cross-sectional view of the load-carrying bed system taken along the line 6-6 of FIG. 1.

With reference to FIGS. 5 and 6, wherein the divider 30 is shown in its stowed state, the cargo bed divider 30 is nestably received in the cargo bed divider cavity 32. As illustrated, the divider cavity 32 can be configured to closely match a contour of the divider 30 such that a height, a width, and a depth of the cavity 32 correspond closely to a height, a width, and a depth of the divider 30. More particularly, as shown, the depth of the cavity 32 can vary according to the varying depth of the divider 30 when in its stowed state and the extension sections 42, 44 are in their respective compact positions. Thus, a portion 76a of a tailgate wall 76 defining a depth of the cavity 32 can be spaced apart from an interior surface 78 of the tailgate wall 76 a greater distance than a portion 76b of the wall 76. In other words, wall portion 76a can be positioned for nestably receiving the folded-over extension sections 42, 44 of the divider 30 and the wall portion 76b can be positioned at a location less spaced apart from the surface 78 to nestably receive and accommodate only the main divider section 40.

As illustrated in FIGS. 1-4, the load-carrying bed system 10 can further include a cover or lid 82 pivotally mounted to the tailgate 26 for selectively securing the divider 30 in the cavity 32 when the cover 82 is in a closed position (as shown in FIGS. 5 and 6). In particular, the cover 82 can be pivotally secured to the tailgate 26 by one or more hinges 84. The cover 82 is movable to an open position (as depicted in FIG. 2) for allowing the divider 30 to be removed from the cavity 32, or alternately to be positioned within the cavity 32 when not already therein. As shown, the cover 82 can be flush with the tailgate 26 such that cover 82 partially forms the interior surface 78. It is to be appreciated by those skilled in the art that the cover 82 can be moved to its open position and the divider 30 removed from the cavity 32 when the tailgate 26 is open (in either its swing-open or fold-down positions) or closed.

A latching mechanism can be provided that selectively locks the cover 82 in its closed position and, when the divider 30 is received in the cavity 32, the latching mechanism can selectively lock the cover in its closed position and thereby lock the divider 30 in the cavity 32. The latching mechanism can be manipulable to move the cover 82 between its closed position and its opened position. In the illustrated embodiment, the latching mechanism includes one or more (three are shown) latch members 86 that are each rotatable between an unlocked position and a locked position. As shown, each latch member 86 can include an actuating portion 86a accessible and protruding through the inner tailgate surface 78 and an arm portion 86b that is selectively received through an aperture 88 defined in tailgate wall 90 that partially defines a depth of the cavity 32. Accordingly, when the latch member 86 is in its locked position (with the cover 82 in its closed position), the arm portion 86b is received through the aperture 88 to lock the cover 82 in the closed position. In an unlocked position (illustrated in FIG. 2), the arm portion 86b of each latch member 86 is turned so as to be parallel to an upper edge 82a of the cover and thereby not obstruct opening and closing of the cover 82. It is contemplated that the actuating portion 86a of each latch member could be a key operated device so as to prevent undesirable operation of each latch member.

The bed 14 can optionally include a trunk compartment 96 (best shown in FIG. 5) located below the bed floor 16 and having an access opening 98 disposed through the bed floor 16. As illustrated, the access opening 98 can be located longitudinally between the tailgate 26 and the divider 30 when the divider is located in the first predetermined position (i.e., the position illustrated in FIGS. 3 and 4) such that the divider separates the bed floor 16 into distinct storage areas including a first storage area 100 generally between the access opening 98, and particularly on a portion of the bed floor 16 spaced immediately forward of the access opening 98, and the forward wall 24 and a second storage area 102 including the access opening 98 (i.e., between the divider 30 as illustrated in FIGS. 3 and 4 and the tailgate 26 when in its closed position).

As shown, a trunk lid 104 can be pivotally secured to the bed floor 16 over the access opening 98 to selectively prevent access into the trunk compartment 96 and/or selectively secure contents within the trunk compartment 96. The first predetermined position (the position in which the divider 30 is shown in FIGS. 3 and 4) allows cargo to be stored between the forward wall 24 and the divider 30 (i.e., in the first storage area 100) when the divider is in the first predetermined position and simultaneously allowing the trunk lid 104 to be opened and closed (i.e., the divider 30 does not obstruct opening and closing of the trunk lid when in the first position). The lid 104 can include a latching mechanism 106 for facilitating opening and closing, and possibly locking, of the trunk lid 104.

When the divider 30 is in its stowed state, (i.e., nestably resting within the cavity 32 in the tailgate 26), the cargo bed 14 can be used as is conventionally known. Receipt of the divider 30 in the cavity 32 of the tailgate 26 allows the divider to be fully integrated into the load-carrying bed system 10 without obstructing use of the cargo bed 14 and allowing the cargo bed to remain aesthetically pleasing (there is no visual divider stored within the cargo bed). To access the cavity 32 and remove the divider 30 therefrom, the cover 82 is moved from its closed position shown in FIG. 1 to its open position shown in FIG. 2.

Any latching mechanism securing the cover 82 in its closed position would of course have to be unlatched to allow the cover 82 to move to its open position. For example, the illustrated cover 82 includes latch members 86 which would be required to be moved toward their respective open positions to allow the cover 82 to move to its open position. With the cover 82 in its open position, the divider 30 can be removed from the cavity 32 and installed in any one of several predetermined positions within the cargo bed 14. For example, the divider 30 can be positioned within the first predetermined position as shown in FIG. 3. The cover 82 can be moved back to its closed position and any provided latching mechanism or mechanisms can be used to securely latch the cover 82 in its closed position until desirable to return the divider 30 to the cavity 32.

When the divider 30 is initially removed from the cavity 32, the sections 42 and 44 are unfolded from the main section 40 as illustrated in FIG. 7. Subsequent to unfolding, the locking mechanism, the locking members 50 in the illustrated embodiment, is used to secure the extension sections 42, 44 in their extended positions as shown in FIGS. 8 and 9. With the extension sections in their expanded positions, the divider 30 can then be installed in one of the predetermined positions, such as the first predetermined position shown in FIG. 3. When desirable to return the divider 30 to the tailgate cavity 32, the locking mechanism, including locking members 50, can be moved back to their unlocked positions and the extension sections 42, 44 can be refolded onto the main section 40 (i.e., the extension sections 42, 44 are returned to their respective compact positions). The cover 82 can be opened as described hereinabove and the divider 30 returned to the cavity 32.

With reference to FIGS. 11-14, the divider 120 is shown according to an alternate embodiment. Like the divider 30, the divider 120 includes a main divider section 122 and a pair of extension divider sections 124, 126 flanking the main divider section 122. Each of the extension divider sections 124, 126 is movable between an expanded position and a compact position as will be described in more detail below. Except as described herein, the divider 120 functions and can be used in the manner as already described in reference to the divider 30. For example, the divider sections 124, 126 are each in their respective expanded positions when the divider 120 is in a dividing state and are each in respective compact positions when the divider 120 is in a stowed state.

Figure 12:
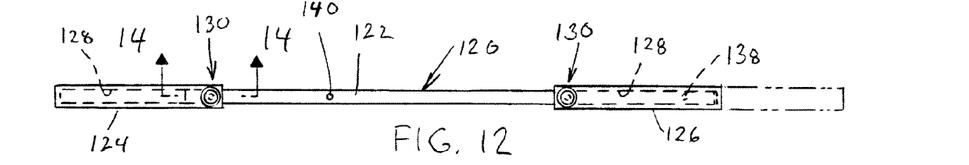
FIG. 12 is a plan view of the divider of FIG. 11 showing one extension section of the divider telescopingly retracted to a compact position.
Figure 13:
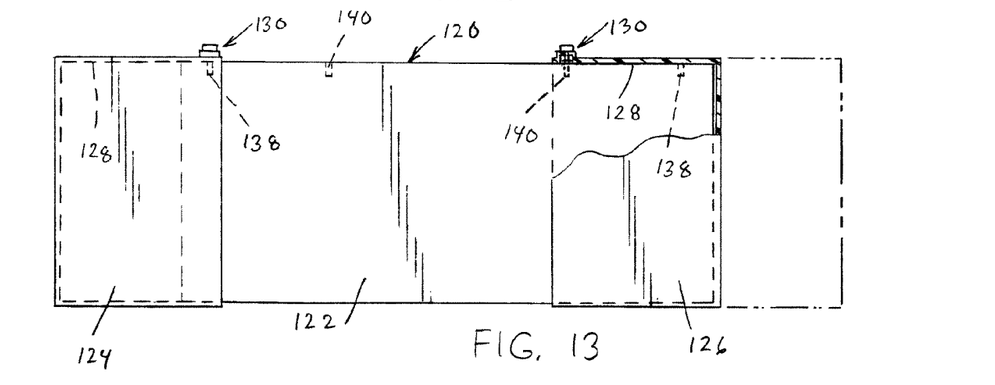
FIG. 13 is an elevational view, partially in cross section, of the divider of FIG. 12.
Figure 14:
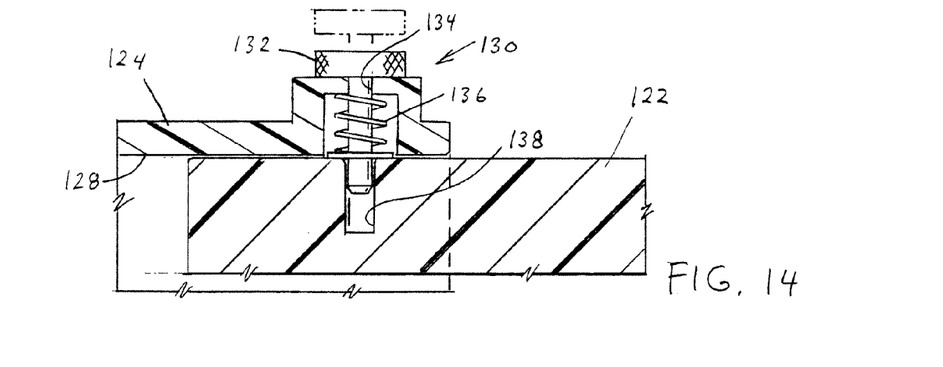
FIG. 14 is a partial cross-sectional view of the divider taken along the line 14-14 of FIG. 12.

Unlike the divider 30, the extension divider sections 124, 126 of the divider 120 are telescopingly attached to the main divider section 122 for movement between their respective expanded positions and their respective compact positions. More particularly, each of the divider sections 124, 126 is telescopingly expandable from the main section 122 when moved from the compact position to the expanded position and telescopingly collapsible onto the main section 122 when moved from the expanded position to the compact position, as generally shown in FIG. 12 with respect to the extension section 126. More specifically, as shown, the extension sections 124, 126 can each include a large receiving aperture 128 into which the main section 122 is received. In particular, the main section 122 is received substantially into the apertures 128 of the sections 124, 126 when in their respective compact positions and only partially received therein when in their respective expanded positions.

A locking mechanism 130 can be provided between each extension section 124, 126 and the main section 122. In the illustrated embodiment, each locking mechanism 130 includes a spring loaded pin 132 that is selectively received in one of two apertures to lock the extension section 124 or 126 in either its compact position or its expanded position. More particularly, the pin 132 is received through an aperture 134 defined in the extension section 124 or 126 and is urged toward an extended position by a spring 136. When the extension section 124, for example, is in its expanded position (shown in FIG. 14), its pin 132 is aligned with a first pin slot 138 defined in the main section 122 and can releasably lock the extension section 124 in its expanded position. To move the extension section 124 to its compact position, its pin 132 is moved against the urging of the spring 136 and removed from the slot 138 which allows telescopingly sliding movement of the extension section 124 relative to the main section 122. When the extension section 124 is in the compact position, its spring loaded pin 132 is aligned with another pin slot 140 and can be received therein for locking the extension section 124 in its compact position. The locking mechanism 130 provided between the extension section 126 and the main section 122 can operate in a similar fashion and can include similarly positioned slots 138, 140.

Figure 15:
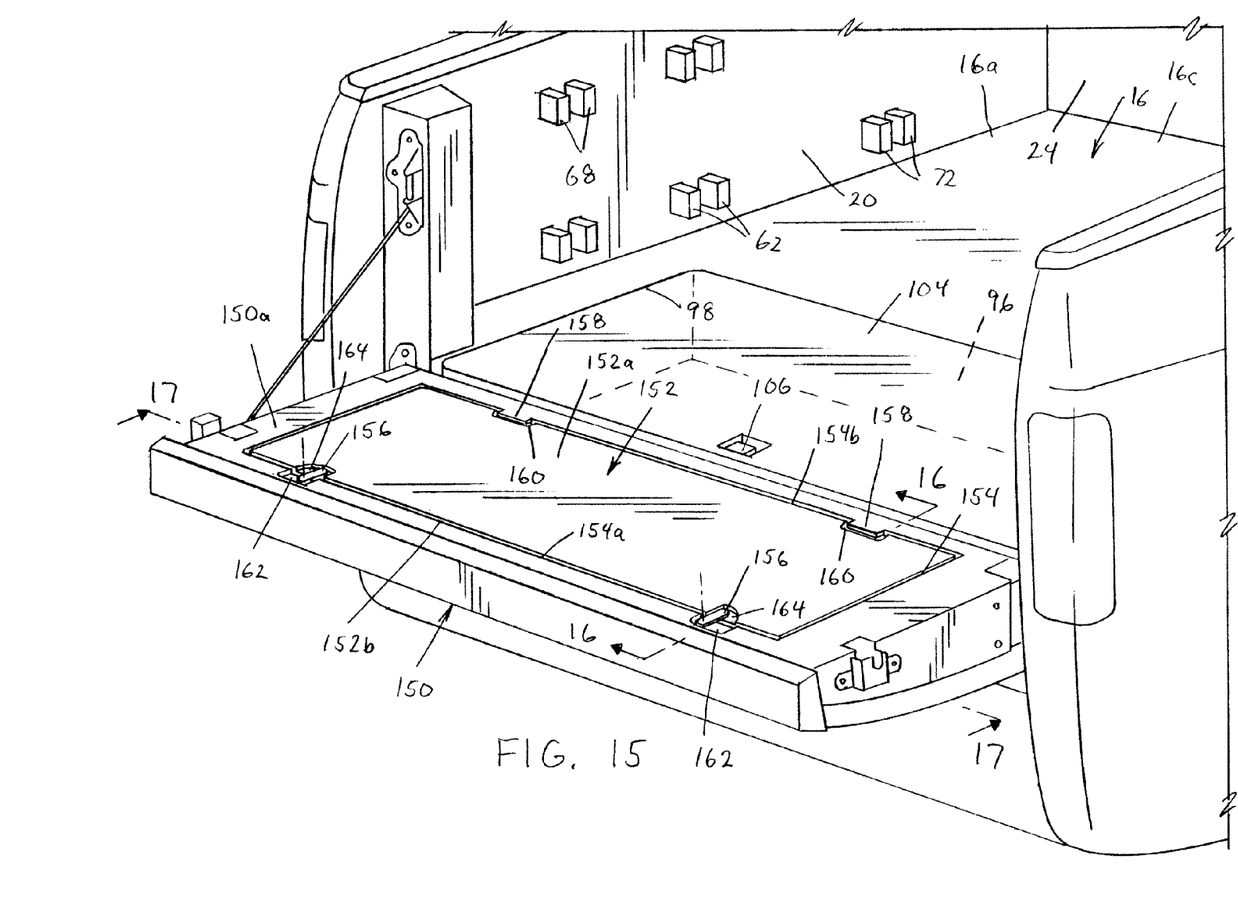
FIG. 15 is a partial perspective view of a load-carrying bed system for a vehicle having a divider stowed nestably within a cavity in a tailgate without a lid according to an alternate embodiment.
Figure 16:
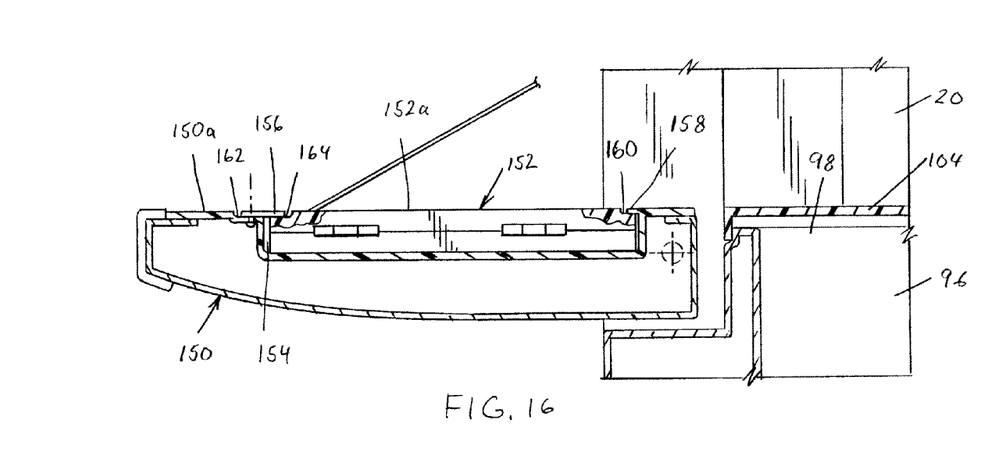
FIG. 16 is a partial cross-sectional view of the load-carrying bed system taken along the line 16-16 of FIG. 15.
Figure 17:
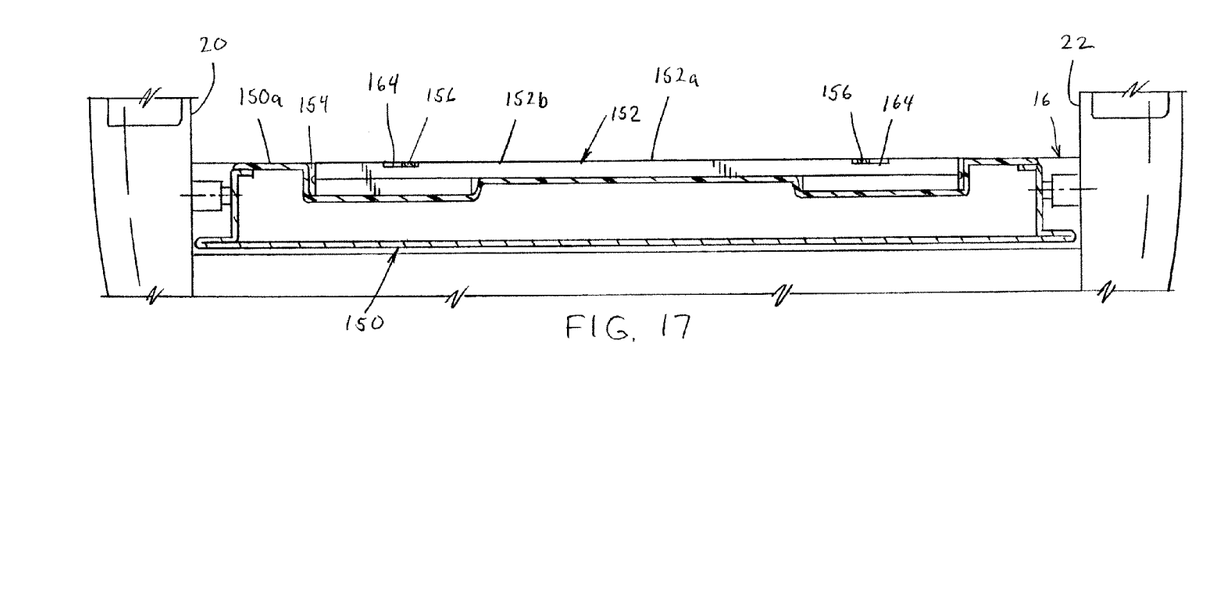
FIG. 17 is a partial cross-sectional view of the load-carrying bed system taken along the line 17-17 of FIG. 15.

With reference to FIGS. 15-17, the tailgate 26 and divider 30 of FIGS. 1-10 are replaced with a tailgate 150 and divider 152. In most respects, the tailgate 150 and divider 152 are the same or similar as the tailgate 26 and the divider 30 already herein described. However, the arrangement depicted in FIGS. 15-17 does not include a cover, such as the cover 82, for securing the divider 152 within a cavity 154 of the tailgate 150. As shown, the cavity 154 is not as deep as the cavity 32 and thereby positions the divider 152, when resting therein, at a location wherein an upper or forward surface 152a of the divider 152 forms a contiguous surface with tailgate surface 150a (i.e., the divider surface 152a is flush with the tailgate surface 150a when the divider 152 is nestably received within the cavity 154).

For locking the divider 152 within the cavity 154, toggle clamps 156 are disposed on the tailgate 150. In the illustrated embodiment, two spaced apart toggle clamps 156 are disposed on the tailgate 150 in a location adjacent an upper end 154a of the cavity and adjacent an upper end 152b of the divider 152 for securing the divider 152 within the cavity 154. Each of the toggle clamps 156 is movable from a locked position, wherein the toggle clamp obstructs removal of the divider 152 when nestably received within the cavity 154, and an unlocked position, wherein the toggle clamp does not obstruct removal of the divider, when nestably received within the cavity 154, or replacement of the divider 152 into the cavity 154. The tailgate 150 can additionally include protrusions 158 extending into a lower side 154b of the cavity 154 and received within notched portions 160 of the divider 152 to facilitate locking of the divider 152 within the cavity 154. The toggle clamps 156 can be disposed within recesses 162 of the tailgate 150 along the upper side 154a of the cavity 154 and, when in their respective locked positions, can be received within recessed portions 164 of the divider 152. In all other respects, the tailgate 150 and the divider 152 operate and function as already described herein in reference to the tailgate 26 and the divider 30.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A load-carrying bed system for a vehicle having a cargo bed, said bed system comprising:
a bed floor defining a cargo receiving area;
first and second sidewalls disposed along lateral sides of the bed floor;
a forward wall disposed along a forward side of the bed floor and laterally between the first and second sidewalls;
a tailgate disposed along a rearward side of the bed floor and laterally between the first and second sidewalls; and
a cargo bed divider movable between a stowed state wherein said cargo bed divider is nestably stowed in a cargo bed divider cavity defined in said tailgate for preventing movement of said divider in said cavity in said stowed state and a dividing state wherein said cargo bed divider has a first end removably secured to said first sidewall and a second end removably secured to said second sidewall to divide said bed floor into distinct storage areas;
wherein said cargo bed divider includes a main divider section and a pair of extension divider sections flanking the main divider section, each of said extension divider sections movable between an expanded position and a compact position, said divider sections each in said expanded position when said cargo bed divider is in said dividing state and each in said compact position when said cargo bed divider is in said stowed state;
wherein said tailgate includes a tailgate wall defining said cargo bed divider cavity, said tailgate wall includes first wall portions defining a first depth of said cargo bed divider cavity being spaced apart from an interior surface of said tailgate wall a first distance and a second wall portion defining a second depth or said cargo bed divider cavity being spaced apart from said interior surface of said tailgate wall a second distance, which is less than the first distance, wherein each extension divider section is received on a respective first wall portion and said main divider section is received on said second wall portion.

2. The load-carrying bed system of claim 1 wherein each of said extension divider sections is pivotally attached to said main divider section for movement between said expanded position and said compact position, each of said extension divider sections foldable onto said main section when moved from said expanded position to said compact position for compacting said cargo bed divider for stowage in said cargo bed divider cavity defined in said tailgate, and each of said extension divider sections is unfoldable from said main section when moved from said compact position to said expanded position for expanding said cargo bed divider for use in separating said bed floor into distinct storage areas.

3. The load carrying-bed system of claim 1 wherein each of said extension divider sections is telescopingly attached to said main divider section for movement between said expanded position and said compact position, each of said extension divider sections telescopingly expandable from said main section when moved from said compact position to said expanded position and telescopingly collapsible onto said main section when moved from said expanded position to said compact position.

4. The load-carrying bed system of claim 1 wherein said cargo bed divider is generally rigid or formed of generally rigid sections.

5. The load-carrying bed system of claim 1 wherein said first end of said divider is received in a first channel defined between first bed divider locators protruding into said cargo receiving area from said first sidewall and said second end of said divider is received in a second channel defined between second bed divider locators protruding into said cargo receiving area from said second sidewall, said first channel longitudinally aligned with said second channel along said bed floor to position said divider laterally across said bed floor in a first predetermined position.

6. The load-carrying bed system of claim 5 further including a trunk compartment located below said bed floor and having an access opening disposed through said bed floor, said access opening located longitudinally between said tailgate and said divider when said divider is located in said first predetermined position such that said divider separates said bed floor into distinct storage areas including a first storage area generally between said access opening and said forward wall and a second storage area including said access opening.

7. The load-carrying bed system of claim 6 further including a trunk lid pivotally secured to said bed floor over said access opening, said first predetermined position allowing cargo to be stored between said forward wall and said divider when said divider is in said first predetermined position and simultaneously allowing said trunk lid to be opened and closed.

8. The load-carrying bed system of claim 5 wherein said first bed divider locators and said second bed divider locators form a first set of bed divider locators for locating said divider in said first predetermined position, one or more additional sets of bed dividers protruding into said cargo receiving area from said sidewalls, each one or more additional sets defining longitudinally aligned channels on said first and second sidewalls to position said divider laterally across said bed floor in one or more additional predetermined positions.

9. The load-carrying bed system of claim 1 wherein said cargo bed divider cavity is configured to closely match a contour of said cargo bed divider such that a height, a width and a depth of said cavity correspond closely to a height, a width and a depth of said divider.

10. The load-carrying bed system of claim 1 further including:
toggle clamps disposed on said tailgate for securing said cargo bed divider in said cargo bed divider cavity, each of said toggle clamps movable from a locked position wherein said toggle clamp obstructs removal of said divider when nestably received in said cavity and an unlocked position wherein said toggle clamp does not obstruct removal of said divider when nestably received in said cavity.

11. The load-carrying bed system of claim 1 further including a cover pivotally mounted to said tailgate for selectively securing said divider in said cavity when said cover is in a closed position, said cover movable to an open position for allowing said divider to be positioned within or removed from said cavity.

12. The load-carrying bed system of claim 11 further including a latching mechanism that selectively locks said cover in said closed position and thereby locks said divider in said cavity when received therein, said latching mechanism manipulable to move said cover between said closed position and said open position.

13. A tailgate assembly for a vehicle's load-carrying bed, said tailgate comprising:
a tailgate for selectively closing one end of the load-carrying bed;
a cargo bed divider cavity defined in said tailgate and defined by a first lateral internal surface being laterally spaced from a second lateral internal surface; and
a generally rigid divider nestably received in said cavity to prevent movement of said divider within said cavity, said divider removable from said cavity and positionable within the load-carrying bed for dividing the bed into sections, said divider being adjustable in size between a stowed state in which said divider is collapsed and an in-use state wherein said divider is expanded, in said stowed state said divider has a first lateral dimension and in said in-use state said divider has a second lateral dimension, which is greater than the first lateral dimension, wherein said divider first lateral dimension closely matches a lateral distance between said first lateral internal surface and said second lateral internal surface, wherein said divider in said stowed state when nestably received within said tailgate and said divider in said in-use state when removed from said cavity and positioned within the load-carrying bed for dividing the bed into sections, wherein said divider is a folding divider having a main section and at least one extension section pivotally attached to said main section, said at least one extension section folded onto said main section into a collapsed position when said divider is in said stowed state and unfolded from said main section to an extended position when said divider is in said in-use state, wherein said cargo bed divider cavity is defined by a first wall portion at a first depth and a second wall portion at a second depth, which is less than said first depth and wherein said main section is received on said second wall portion and said at least one extension is received on said first wall portion.

14. The tailgate assembly of claim 13 wherein said cavity is defined in a forward wall of said tailgate.

15. The tailgate assembly of claim 13 wherein said divider is positionable within said load-carrying bed in a predetermined position with a first end of said divider removably secured to a first sidewall of the load-carrying bed and a second end of said divider removably secured to a second sidewall of the load-carrying bed.

16. The tailgate assembly of claim 13 wherein said divider is a telescoping divider having a main section and at least one extension section that is slidably movable relative to said main section, said at least one extension section slidable onto said main section into a collapsed position when said divider is in said stowed state and slidable from said main section to said extended position when said divider is in said in-use state, wherein said cargo bed divider cavity is defined by a first wall portion at a first depth and a second wall portion at a second depth, which is less than said first depth and wherein said main section is received on said second wall portion and said at least one extension is received on said first wall portion.

17. A combination load-carrying bed system and tailgate assembly, comprising:
   a load-carrying bed having a bed floor, first and second sidewalls disposed along sides of said bed floor, and a forward wall disposed along a forward side of said bed floor;
   a tailgate disposed along a rearward side of said bed floor for selectively closing one end of said load-carrying bed;
   an adjustable bed divider movable between a stowed state and an in-use state for selectively dividing' said bed into sections including a main divider section and an extension section attached to said main divider section; and
   a cavity defined in said tailgate and configured to nestably receive said bed divider therein for storing and hiding said divider when in said stowed state, said cavity being sized to prevent movement of said divider in said cavity, and being defined by a first wall portion at a first depth for nestably receiving said extension and a second wall portion at a second depth for nestably receiving said main divider section.

18. The load-carrying bed system of claim 1, wherein said tailgate wall includes a first lateral internal surface spaced apart from a second lateral internal surface, wherein a lateral dimension of said cargo bed divider when in said compact position closely matches a lateral distance between said first lateral internal surface and said second lateral internal surface.

* * * * *